United States Patent [19]

Sasaki et al.

[11] Patent Number: 5,392,678
[45] Date of Patent: Feb. 28, 1995

[54] MITER SAW

[75] Inventors: Katsuhiko Sasaki; Mitsuyoshi Niinomi; Yoshinori Shibata, all of Anjo, Japan

[73] Assignee: Makita Corporation, Anjo, Japan

[21] Appl. No.: 111,479

[22] Filed: Aug. 25, 1993

[30] Foreign Application Priority Data

Aug. 27, 1992 [JP] Japan .................. 4-252215

[51] Int. Cl.6 ........................... B27B 5/36
[52] U.S. Cl. .................. 83/471.3; 83/473; 83/477.1; 83/564; 83/581; 83/698.31; 83/676
[58] Field of Search ........ 83/471.3, 486.1, 581, 83/473, 698, 699, 468.3, 477.1, 676, 564; 403/111, 112, 113, 117

[56] References Cited

U.S. PATENT DOCUMENTS

| 258,794 | 5/1882 | Moss | 403/112 |
|---|---|---|---|
| 723,544 | 5/1903 | Petre | 403/117 |
| 1,646,589 | 10/1927 | Meek et al. | |
| 1,808,453 | 6/1931 | De Koning | 83/471.3 |
| 2,530,290 | 11/1950 | Collins | 83/473 |
| 2,551,670 | 5/1951 | Hansson | 403/111 |
| 2,576,090 | 11/1951 | Krause | 83/473 |
| 2,652,863 | 9/1953 | Grabinski | 83/473 |
| 4,152,961 | 5/1979 | Batson | 83/471.3 |
| 4,270,427 | 6/1981 | Colberg et al. | |
| 4,452,117 | 6/1984 | Brickner et al. | 83/468.3 |
| 4,537,105 | 8/1985 | Bergler | |
| 4,804,170 | 2/1989 | Young et al. | |
| 4,869,142 | 9/1989 | Sato et al. | |

FOREIGN PATENT DOCUMENTS

| 1379222 | 10/1964 | France | 403/117 |
|---|---|---|---|
| 2325457 | 12/1977 | France | |
| 63-49901 | 4/1988 | Japan | |
| 1201160 | 12/1985 | U.S.S.R. | |

*Primary Examiner*—Eugenia Jones
*Assistant Examiner*—Allan M. Schrock
*Attorney, Agent, or Firm*—Dennison, Meserole, Pollack & Scheiner

[57] ABSTRACT

A miter saw includes a base on which a work is placed. A miter saw unit supports a saw blade and has a motor for rotatably driving the saw blade. A support mechanism is provided supporting the miter saw unit relative to the base in such a manner that the miter saw unit is laterally leftwardly and rightwardly pivotable from a vertical position. A biasing member is interposed between the miter saw unit and the base for biasing the miter saw unit in a direction opposite to at least one of the directions of the lateral pivotal movement of the miter saw unit when the miter saw unit is laterally pivoted.

13 Claims, 16 Drawing Sheets

MITER SAW

Background of the Invention

1. Field of the Invention

The present invention relates to a miter saw, and more particularly to a miter saw in which a miter saw unit supporting a saw blade is pivotable to incline the saw blade relative to a base for placing a work thereon.

2. Description of the Prior Art

A conventional miter saw having a miter saw unit pivotable to incline a saw blade relative to a base is used to obliquely cut a work placed on the base.

In order to permit such an inclined positioning of the miter saw unit, Japanese Laid-Open Utility Model Publication No. 63-49901 proposes a miter saw having a support arm (a hinge member) which vertically pivotally supports a miter saw unit and which is laterally pivotally mounted on a base. The support arm includes an arcuate slot formed in the lateral pivotal direction. A screw is inserted into the arcuate slot and is engaged with a part of the base, so that the support arm is kept in position at a vertical position or a laterally leftwardly or rightwardly pivoted position.

The lateral pivotal movement is performed with a handle formed on the miter saw unit being grasped by an operator. However, as the miter saw unit is pivoted laterally from the vertical position, the moment of gravity of the miter saw unit in the pivotal direction increases. Therefore, the operator must hold the miter saw unit by a larger force as the miter saw unit is pivoted laterally downwardly. This may cause the problem in the operability of the miter saw. Further, when the operator releases the handle in the course of the pivotal movement, the miter saw unit is abruptly pivoted downwardly, the screw for keeping the miter saw unit may abut on the edge of the arcuate slot, causing damages to the support arm or the miter saw unit. Additionally, in this kind of miter saw, the motor for driving the saw blade is positioned laterally of the miter saw unit, and therefore, the miter saw unit may automatically pivot in a direction toward the lateral side on which the motor is positioned when the screw is loosened to release fixing of the miter saw unit. This may cause the problem that the operator must hold the miter saw unit in a stable condition even at the vertical position.

SUMMARY OF THE INVENTION

It is, accordingly, an object of the present invention to provide a miter saw which does not require a larger force for supporting a miter saw unit in the course of the lateral pivotal movement.

It is another object of the present invention to provide a miter saw which does not cause abrupt downward movement of the miter saw unit when the miter saw unit is released in the course of the lateral pivotal movement.

According to the present invention, there is provided a miter saw comprising:

a base on which a work is placed;

a miter saw unit supporting a saw blade and having a motor for rotatably driving the saw blade;

a support mechanism for supporting the miter saw unit relative to the base in such a manner that the miter saw unit is laterally leftwardly and rightwardly pivotable from a vertical position; and a biasing member interposed between the miter saw unit and the base for biasing the miter saw unit in a direction opposite to at least one of the directions of the lateral pivotal movement of the miter saw unit when the miter saw unit is laterally pivoted.

The invention will become more apparent from the appended claims and the description as it proceeds in connection with the drawings.

DETAILED DESCRIPTION OF THE PREFERRED EMBODIMENTS

(First Embodiment)

A first embodiment of the present invention will now be explained with reference to FIGS. 1 to 12.

Figure 1:
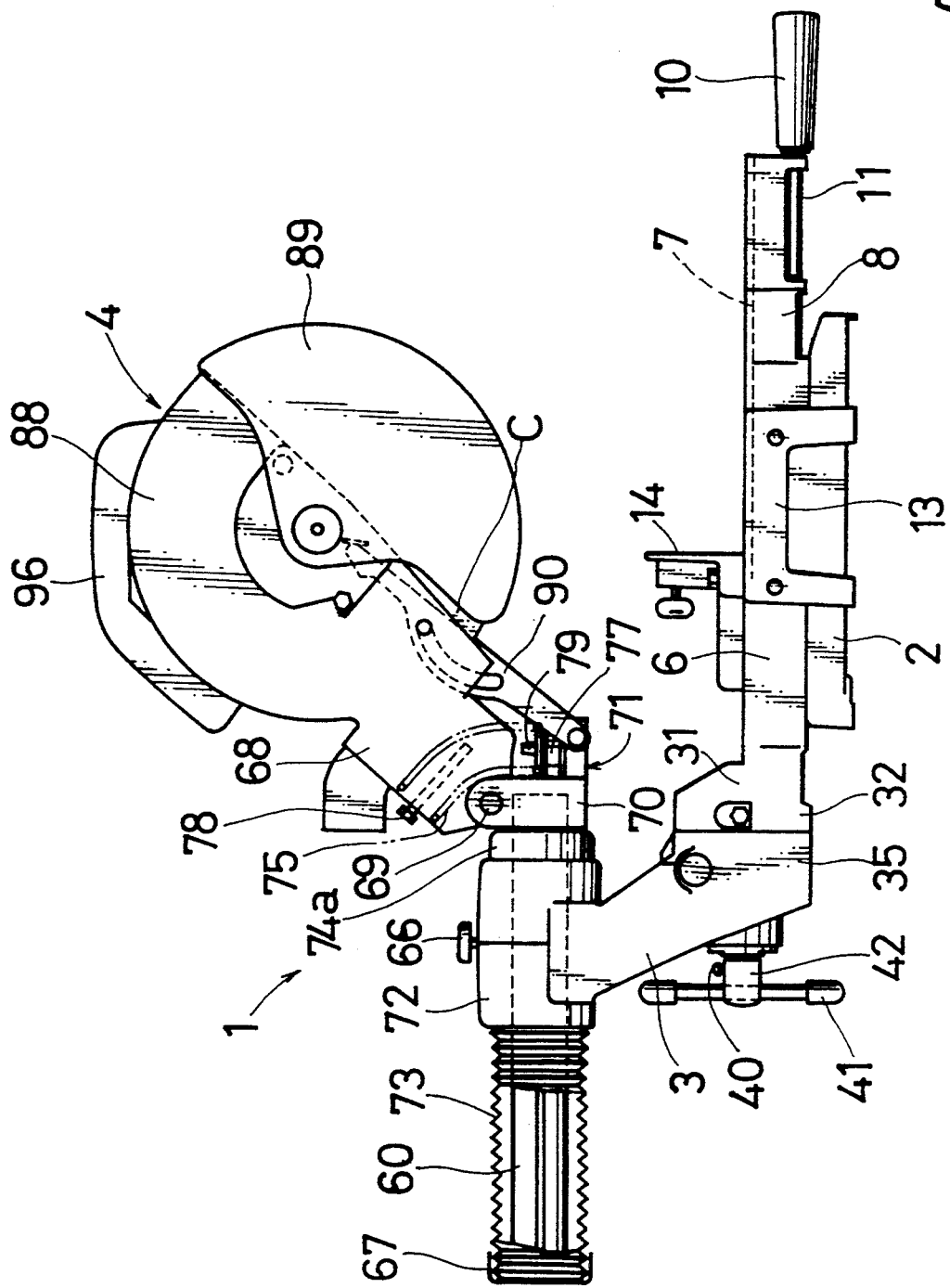
FIG. 1 is a side view of a miter saw according to a first embodiment of the present invention.
Figure 2:
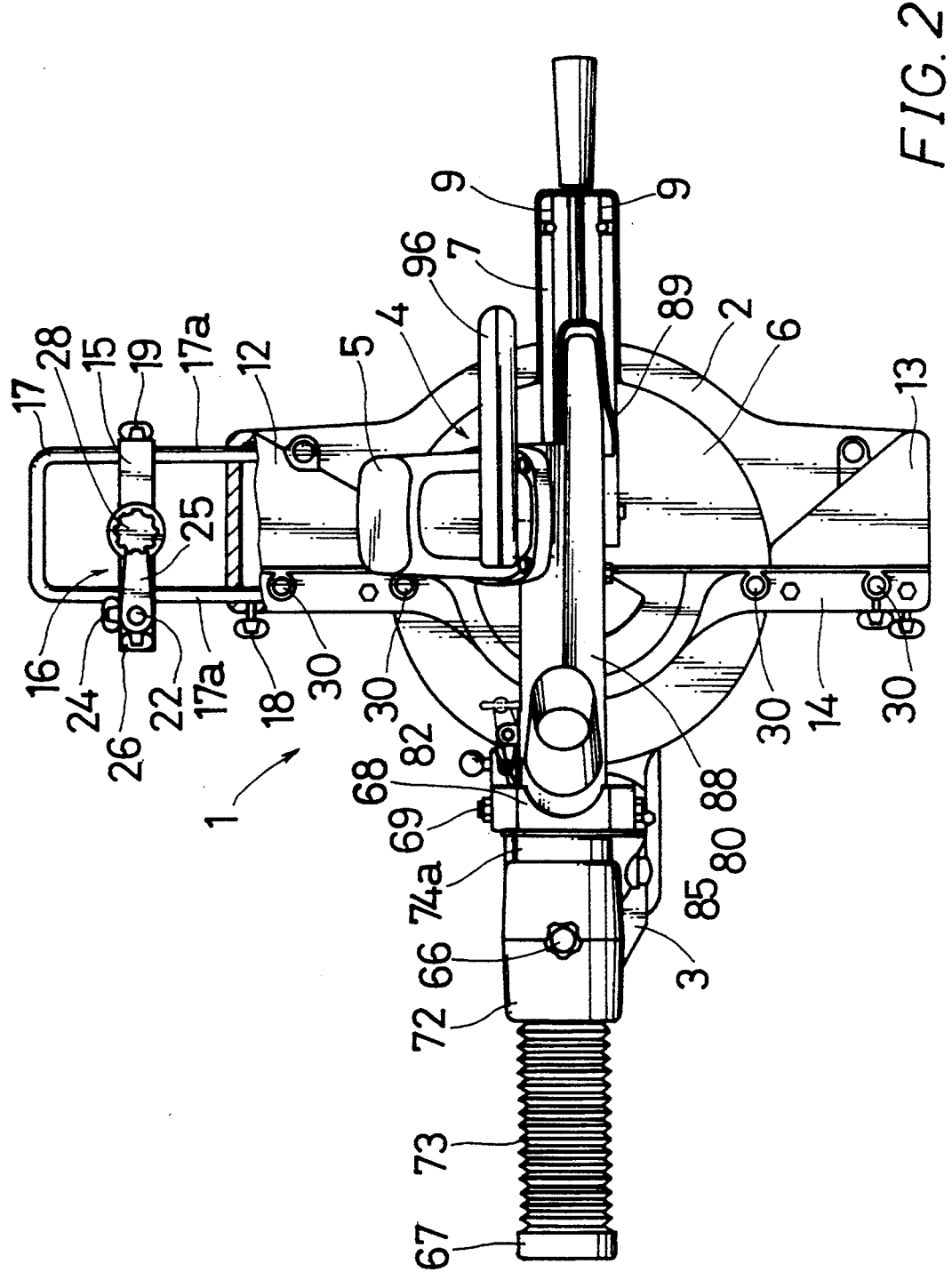
FIG. 2 is a plan view of FIG. 1.
Figure 3:
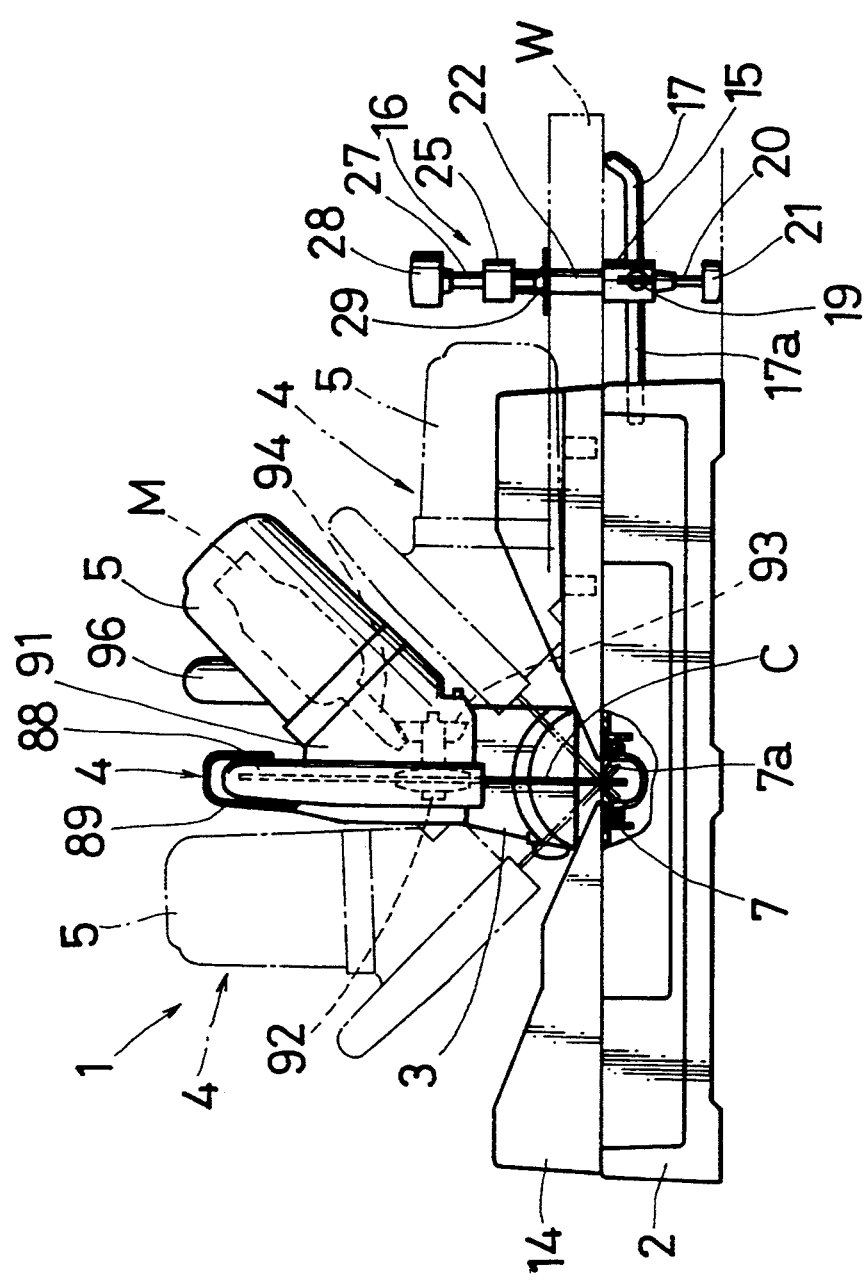
FIG. 3 is a front view, with a part broken away, of FIG. 1.

Referring to FIGS. 1 to 3, there is shown a side view, a plan view and a front view, respectively, of a miter saw 1 according to the first embodiment.

The miter saw 1 includes a base 2 on which a work is placed. A miter saw unit 4 supports a circular saw blade C and is vertically pivotally and laterally pivotally mounted on the base 2 through a support member 3. The miter saw unit 4 is integrally formed with a motor housing 5 which accommodates a motor M for driving the saw blade C. The longitudinal axis of the motor M as well as that of the motor housing 5 is inclined relative to the saw blade C by an angle of 45°, so that the motor housing 5 extends obliquely upwardly relative to the miter saw unit 4.

Figure 4:
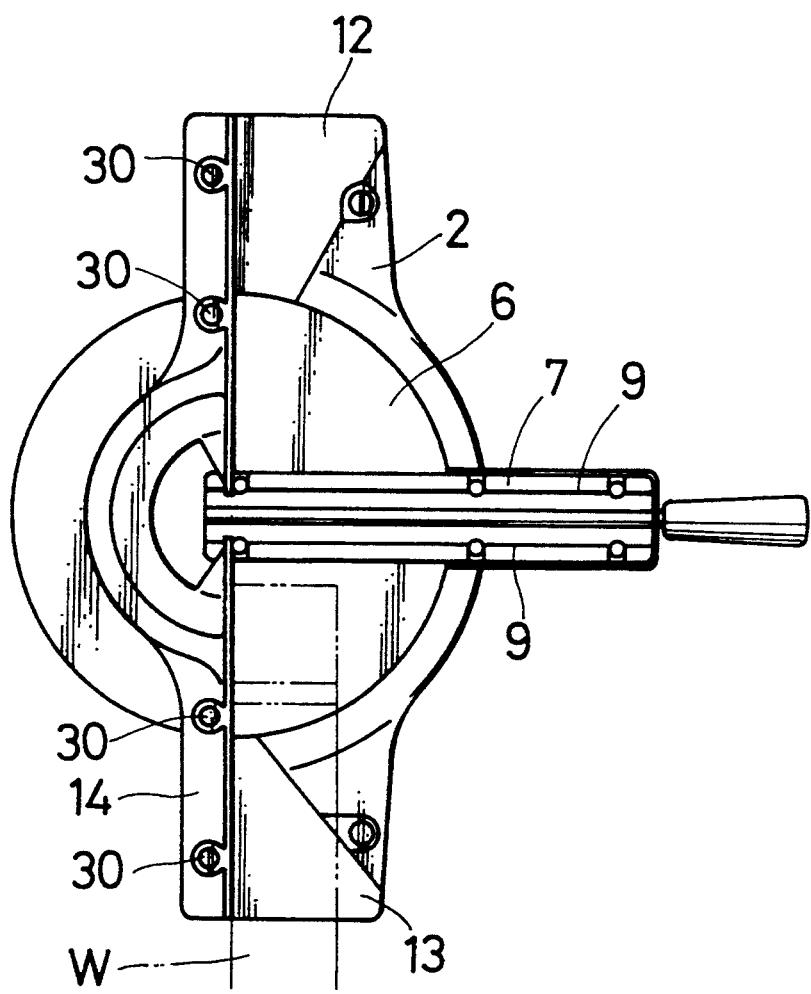
FIG. 4 is a plan view of a base including a turntable shown in FIG. 1.

A turntable 6 is mounted on the central portion of the base 2 and is rotatable within a horizontal plane relative to the base 2. The rotation of the turntable 6 is limited within a predetermined angle. The turntable 6 includes a plate 7 disposed in a diametrical direction of the turntable 6 and partly extends laterally outwardly therefrom. A protrusion 8 is formed on the turntable 6 so as to support the extended portion of the plate 7. As shown in FIG. 4, a plurality of parallel lines 9 are drawn on the plate 7 in the longitudinal direction thereof and are served as reference lines for positioning of an inked line drawn on the work. In the state shown in FIG. 4, a cut-out recess is not as yet formed on the plate 7.

An operational rod 11 is rotatably mounted on the lower part of the protrusion 8 and includes a grip 10 mounted on one end thereof. The grip 10 extends outwardly from the protrusion 8 for operation by an operator to turn the turntable 6. As the operator rotates the operational rod 11, the operational rod 11 is moved away from and toward a part of the outer wall of the base 2 by means of a thread mechanism (not shown) provided between the operational rod 11 and the protrusion 8, so that the turntable 6 can be fixed relative to the base 2 at any desired rotational position.

The base 2 includes a pair of work support tables 12 and 13 which are opposed to each other in a diametrical direction of the turntable 6 which is perpendicular to the longitudinal direction of the plate 7. The support tables 12 and 13 are disposed adjacent the peripheral portion of the turntable 6. The upper surfaces of the work support tables 12 and 13 are positioned in the same plane as the upper surface of the turntable 6 to form a work placing surface. A fence 14 extends between the work support tables 12 and 13 over the turntable 6 for abutment of the lateral surface of the work thereon.

As shown in FIG. 2, an adjustable holder 15 is additionally provided for supporting the work and is disposed at the outer end of the work support table 12 which is positioned on the same side as the motor housing 5 with respect to the miter saw unit 4. A vertical vice device 16 is provided for vertically clamping the work placed on the holder 15.

Figure 5:
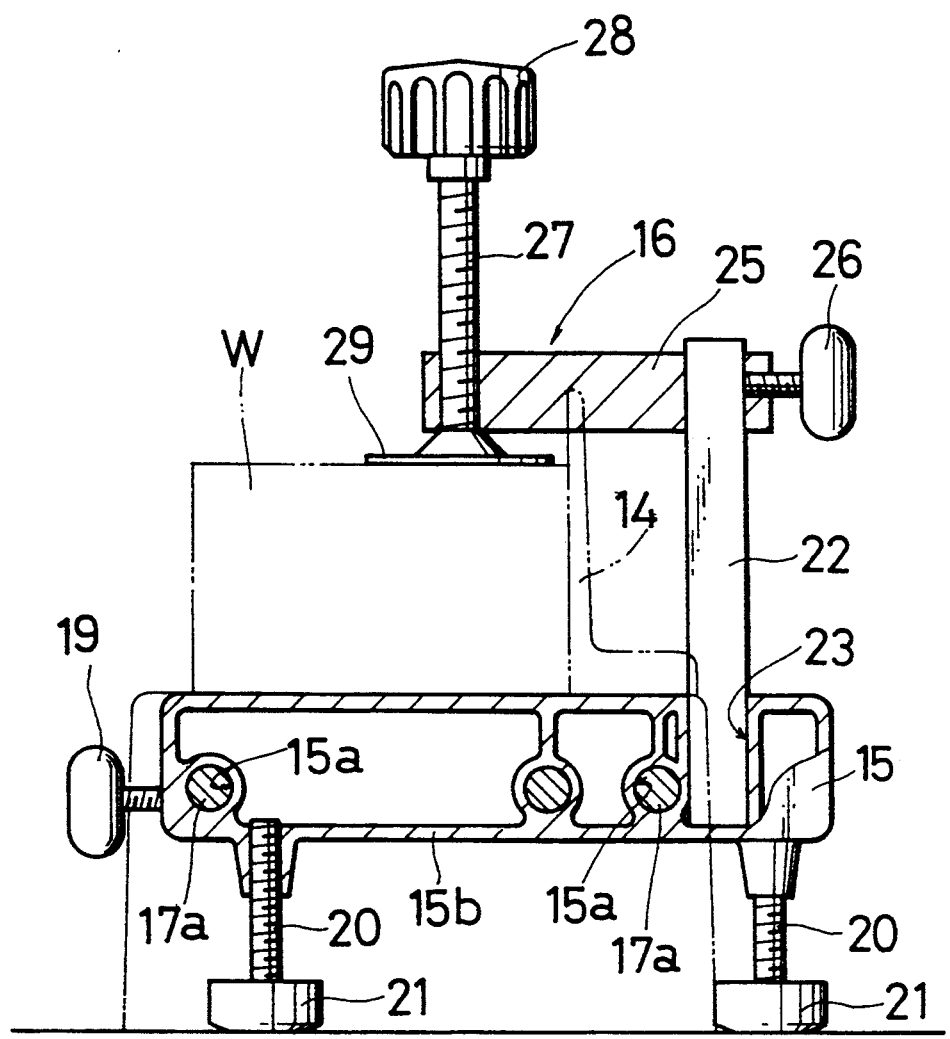
FIG. 5 is a sectional view of a holder and a vice device shown in FIG. 1.

The construction of the holder 15 and that of the vice device 16 will now be explained with reference to FIGS. 2, 3 and 5.

A substantially U-shaped guide member 17 is detachably mounted on the end portion of the work support base 12 through a thumbscrew 18 and includes a pair of parallel linear portions 17a which extend in a radial direction of the turntable 6. The holder 15 includes a pair of insertion holes 15a for receiving the linear portions 17a, respectively, so that the holder 15 is slidably movable along the linear portions 17a. A thumbscrew 19 is screwed into the forward portion of the holder 15 for fixing the position of the holder 15 relative to the linear portions 17a. A pair of vertical support legs 21 are mounted on the bottom 15b of the holder 15 and include threaded shaft portions 20 in engagement with the bottom 15b, respectively, so that the vertical position of the holder 15 can be adjusted.

The vice device 16 includes a vertical support shaft 22 which extends vertically upwardly from the rear portion of the holder 15. The lower part of the vertical support shaft 22 is inserted into a corresponding insertion hole 23 having a bottom end and formed on the rear portion of the holder 15. The vertical support shaft 22 is detachably fixed to the holder 15 through a thumbscrew 24. A horizontal support shaft 25 is detachably mounted on the upper end of the vertical support shaft 22 through a thumbscrew 26. The horizontal support shaft 25 includes one end extending to a position above substantially the central portion of the holder 15. A tightening screw 27 is vertically threadably engaged with the one end of the horizontal support shaft 26. The tightening screw 27 includes, at its upper end, a knob 28 for rotational operation by the operator. Further, the tightening screw 27 includes, at its lower end, an abutting member 29, for abutment on the upper surface of a work W shown by a dotted line. Thus, upon tightening of the tightening screw 27, the work W is pressed on the upper surface of the holder 15 through the abutting member 29.

Here, the vice device 16 can be used for holding the work on both lateral sides of the turntable 6 by inserting the vertical support shaft 22 into any of inserting holes 30 which correspond to the inserting hole 23 and which are formed on the fence 14, respectively.

Figure 6:
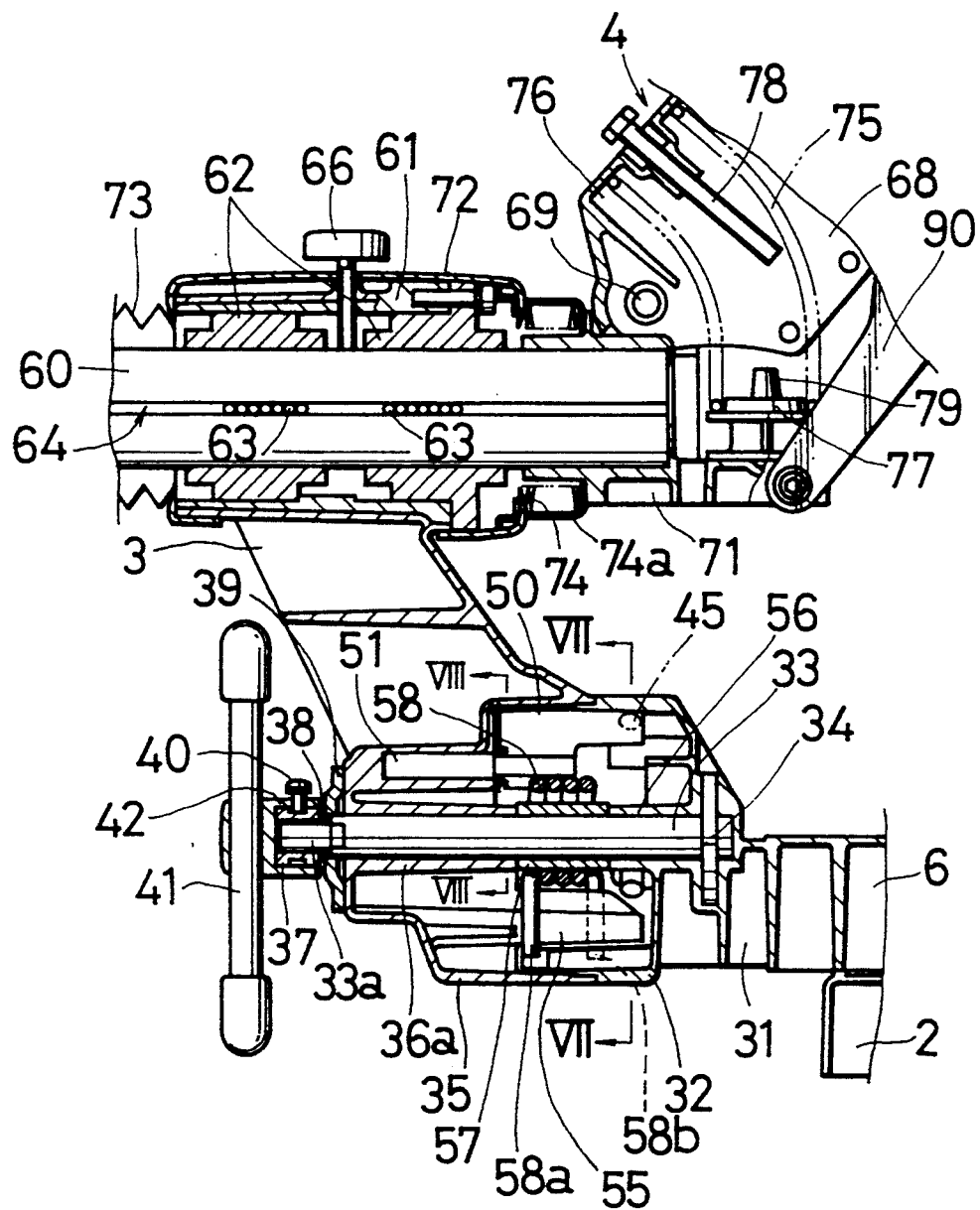
FIG. 6 is a vertical sectional view of a support member shown in FIG. 1.

As shown in FIGS. 1 and 6, the support member 3 is mounted on a bracket 31 for supporting the miter saw unit 4 relative to the base 2. The bracket 31 is integrally formed with the rear end of the turntable 6 and is disposed on the opposite side of the protrusion 8 of the plate 7. The bracket 31 includes a substantially cylindrical support portion 32 which is opened at its rear end. A support shaft 33 is disposed centrally within the support portion 32 and extends rearwardly from the opened end of the support portion 32. The support shaft 33 is fixed to the support portion 32 not to rotate relative thereto through a pin 34. The support member 3 includes, at its lower portion, a cylindrical rotational portion 35 having a configuration corresponding to the support portion 32 and opened at its forward end. The opened forward end of the rotational portion 35 is rotatably fitted on the opened rear end of the support portion 32 in such a manner that the rotational axis of the rotational portion 35 is positioned in substantially the same plane as the upper surface of the base 2 and extends substantially in parallel with the longitudinal direction of the plate 7. The rear portion of the support shaft 33 extends outwardly from the rotational portion 35 through a sleeve 36 which is integrally formed with the rotational portion 35 and which is disposed therewithin. The outwardly extended end of the support shaft 33 includes a threaded portion 33a which is in engagement with a nut 37. A flat washer 38 and a spring washer 39 are interposed between the nut 37 and the rear end of the rotational portion 35. A turning handle 41 includes a handle shaft 42 which is secured to the nut 37 through a screw 40. Thus, as the handle 41 is turned to move the nut 37 forwardly, the spring washer 39 is pressed on the rear end of the rotational portion 35, so that the rotational portion 35 can be fixed in position relative to the support portion 32.

A mechanism is provided between the support portion 32 and the rotational portion 35 for determining the position of the rotational portion 35 relative to the support portion 32 or for determining the vertical position and leftwardly and rightwardly inclined positions of the miter saw unit 4. The construction of this mechanism will now be explained with reference to FIGS. 7 to 10.

Figure 7:
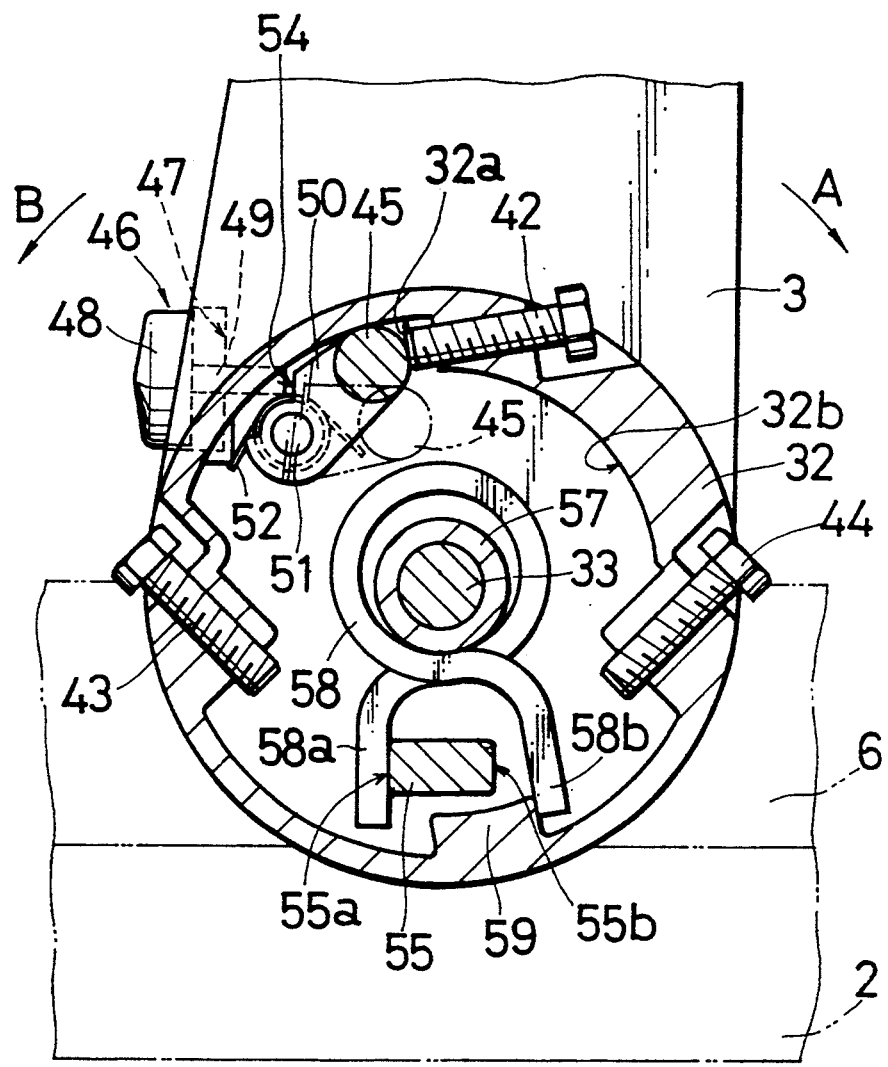
FIG. 7 is a sectional view taken along line VII—VII in FIG. 6.

Referring to FIG. 7 which is a sectional view taken along line VII—VII in FIG. 6, there is shown a first stopper bolt 42, a second stopper bolt 43 and a third stopper bolt 14 which are in engagement with the support portion 32 of the bracket 31. The first stopper bolt 42 is disposed substantially directly above the support shaft 33. The second and the third stopper bolts 43 and 44 are displaced from the first stopper bolt 42 by an angle of 45° in a counterclockwise direction (direction B) and a clockwise direction (direction A), respectively.

The second and the third stopper bolts 43 and 44 are positioned at substantially the same level as the support shaft 33 when the support member 3 is positioned at the vertical position where the saw blade C of the miter saw unit 4 is positioned vertically relative to the base 2. Each of the first to third stopper bolts 42 to 44 has a head portion extending outwardly from the support portion 32 and an end portion extending inwardly of the support portion 32.

Figure 8:
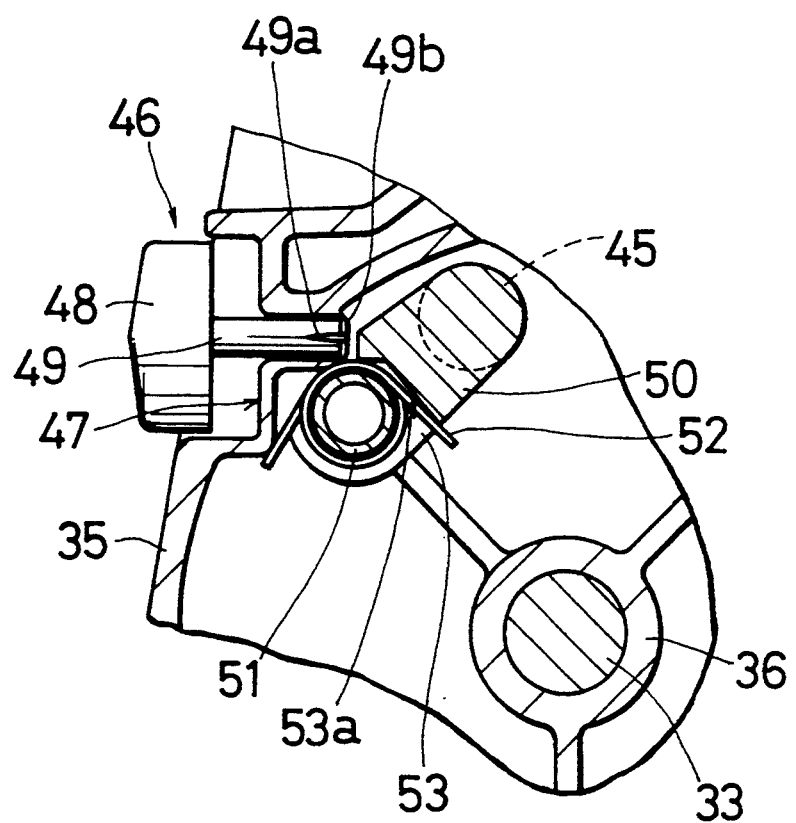
FIG. 8 is a sectional view taken along line VIII—VIII in FIG. 6.

A stopper mechanism 46 is mounted on the rotational portion 35 and includes a stopper pin 45 which abuts on the end portion of the first stopper bolt 42 when the support member 3 is positioned at the vertical position as shown in FIG. 7. The stopper mechanism 46 further includes an operational knob 48 which is operable by the operator and is received within a recess 47 formed on the outer wall of the rotational portion 35 as shown in FIG. 8, a sectional view taken along line VIII—VIII in FIG. 6. The operational knob 48 includes an operational shaft 49 having one end fixed to the operational knob 48 and having the other end inserted into the rotational portion 35 so as to extend to the inside thereof. The other end of the operational shaft 49 is enlarged by forming an axial slit 49a and includes, at its extremity, a peripheral collar 49b formed thereon, so that the operational shaft 49a is prevented from being removed from the rotational portion 35.

Further, as shown in FIG. 8, a lever 50 having one end to which the stopper pin 45 is fixed is disposed within the rotational portion 35 at a position adjacent the operational shaft 49 of the operational knob 48. The lever 50 is pivotally supported by a support pin 51 which is fixedly received by a corresponding inserting hole formed on the rotational portion 35 as shown in FIG. 6. A torsion coil spring 52 is fitted on the support pin 51 and has one end in abutment on the inner wall of a part of the rotational portion 35 which forms the recess 47. The other end of the torsion coil spring 52 is in abutment on a bottom surface 53a of an engaging recess 53 formed on the lever 50. The bottom surface 53a extends substantially vertically relative to a radial direction of the support pin 51, and the other end of the torsion coil spring 52 abuts on the end portion of the bottom surface 53a in the clockwise direction around the support pin 51 as shown in FIG. 8. Thus, the lever 50 is normally biased by the torsion coil spring 52 in the counterclockwise direction around the support pin 51, so that, in the state shown in FIG. 7, the stopper pin 45 abuts on an abutting surface 32a formed on the inner wall of the supporting portion 32 adjacent a mounting portion of the first stopper bolt 42 in the counterclockwise direction (direction A), and therefore, the stopper pin 45 is kept in opposed relationship with the end portion of the first stopper bolt 42.

Further, On the inner wall of the support portion 32, a guide surface 32b is formed between the mounting portion of the first stopper bolt 42 and that of the second stopper bolt 43. The guide surface 32b is continuous with the abutting surface 32a via a stepped portion in the clockwise direction and is positioned radially inwardly of the abutting surface 32a. The function of the guide surface 32b will be described later.

As described above, the motor housing 5 accommodating the motor M extends laterally obliquely relative to the miter saw unit 4, and therefore, in the state of the vertical position shown in FIG. 7, the gravity of the motor M as well as that of the motor housing 5 produces a moment to pivot the support member 3 in the clockwise direction (direction A). Thus, in the state shown in FIG. 7, the rotational portion 35 is forced by the moment applied to the support member 3 in the clockwise direction so as to bring the stopper pin 45 of the lever 50 to abut on the end portion of the first stopper bolt 42. Thus, the support member 3 is determined to be vertically positioned.

As shown in FIG. 7, the lever 50 includes an abutting surface 54 formed on the side opposed to the end portion of the operational shaft 49 of the operational knob 48. As the operator pushes the operational knob 48 into the recess 47, the end portion of the operational shaft 49 moves to abut on the abutting surface 54 of the lever 50, so that the lever 50 is pivoted against the biasing force of the torsion coil spring 52 in the clockwise direction around the support pin 51. Thus, the stopper pin 45 is positioned not to abut on the end portion of the first stopper bolt 42 as shown by dotted line in FIG. 7, and therefore, the support member 3 can be pivoted from the vertical position in the clockwise direction (direction A) in FIG. 7.

As shown in FIG. 6, a stopper member 55 is formed integrally with the rotational portion 35 and is disposed within the lower part thereof. The stopper member 55 extends into the support portion 32 and includes lateral surfaces 55a and 55b which are positioned on substantially the same circumferential line as that passing through the end portions of the second and the third stopper bolts 43 and 44. Thus, when the support member 3 is pivoted in the clockwise direction (direction A), the lateral surface 55a may abut on the end portion of the second stopper bolt 43. On the other hand, when the support member 3 is pivoted in the counterclockwise direction (direction B), the lateral surface 55b may abut on the end portion of the third stopper bolt 44. Consequently, the pivotal movement of the support member 3 can be limited to a determined angle for both leftward and rightward directions.

A torsion coil spring 58 is fitted on a cylindrical spacer 57 which is interposed between the sleeve 36 of the rotational member 35 and a sleeve 56 integrally formed with the support portion 32 for receiving the support shaft 33 (see FIG. 6). As shown in FIG. 7, end portions 58a and 58b of the torsion coil spring 58 intersect each other and are turned in J-shaped configurations in opposite directions to each other. The end portions 58a and 58b extend to a position adjacent the inner wall of the support portion 32 so as to receive the stopper member 55 therebetween. The inner wall of the support portion 32 includes an engaging protrusion 59 having substantially the same width as the stopper member 55. The engaging protrusion 59 is disposed between the second stopper bolt 43 and the third stopper bolt 44 at a position displaced by a short distance from the middle position toward the third stopper bolt 44. In the vertical state of the support member 3 shown in FIG. 7, the end portion 58a of the torsion coil spring 58 positioned on the side of the clockwise direction of the stopper member 55 abuts on the lateral surface 55a of the stopper member 55, while the end portion 58b abuts one lateral side of the engaging protrusion 59 positioned in the counterclockwise direction. Thus, the torsion coil spring 58 biases the rotational portion 35 in the counterclockwise direction (direction B) in FIG. 7 through the stopper member 55. This biasing force may counterbalance the moment produced by the motor M and the motor housing 5 in the direction A, so that the vertical position of the support member 3 can be maintained in stable condition. The moment produced by the biasing force of the torsion coil spring 58 is determined to be slightly smaller than the moment of the motor M and the motor housing 5 when the support member 3 is positioned at the vertical position. Further, the moment produced by the biasing force of the torsion spring 58 is determined to be slightly smaller than the moment of the whole miter saw unit 4 when the miter saw unit 4 or the support member 3 is at the laterally pivoted position.

When the rotational portion 35 is rotated in the direction B from the vertical position shown in FIG. 7 by an angle corresponding to the angular displacement between the stopper member 55 and the engaging protrusion 59, both end portions 58a and 58b are brought in abutment on their corresponding lateral surfaces 55a and 55b of the stopper member 55, respectively, so that no more biasing force is applied to the rotational portion 35. This rotational position of the rotational portion 35 corresponds to a neutral position where the center of gravity of the miter saw unit 4 including the support member 3 and the motor housing 5 is postitioned directly above the support shaft 33.

Figure 9:
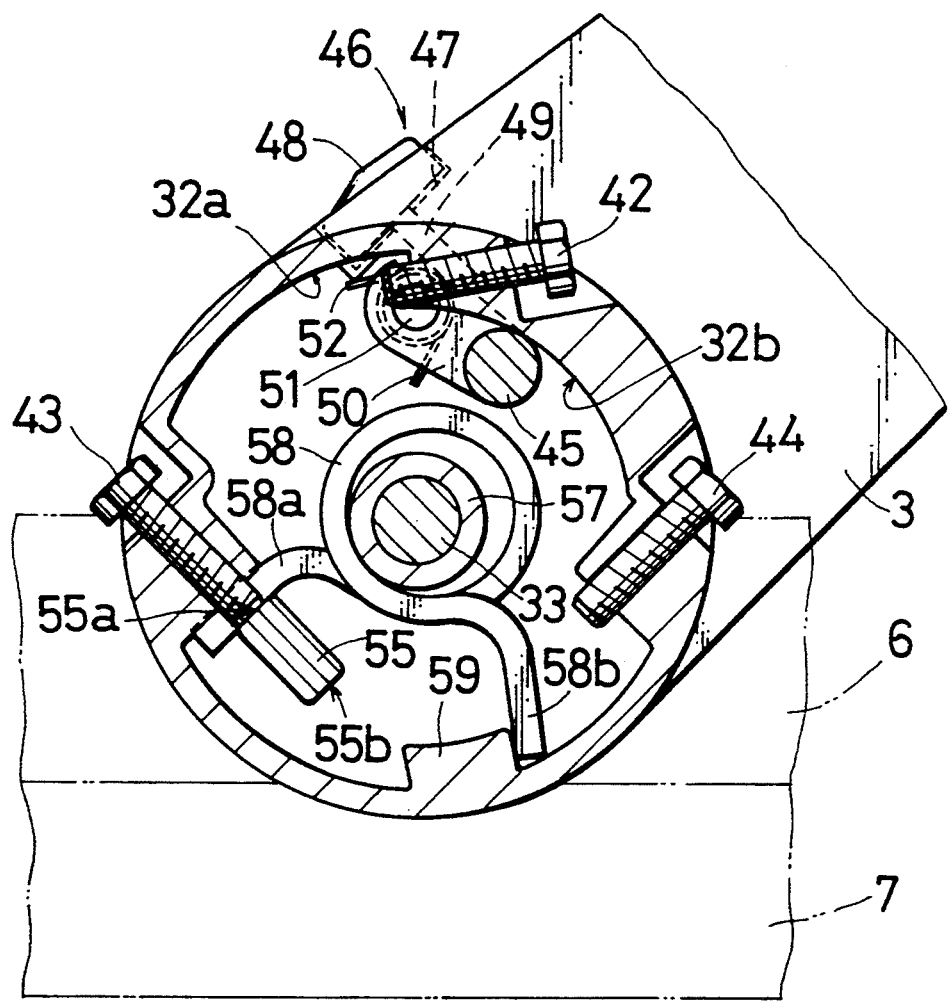
FIG. 9 is a view similar to FIG. 7 but showing the support member pivoted in the rightward direction.
Figure 10:
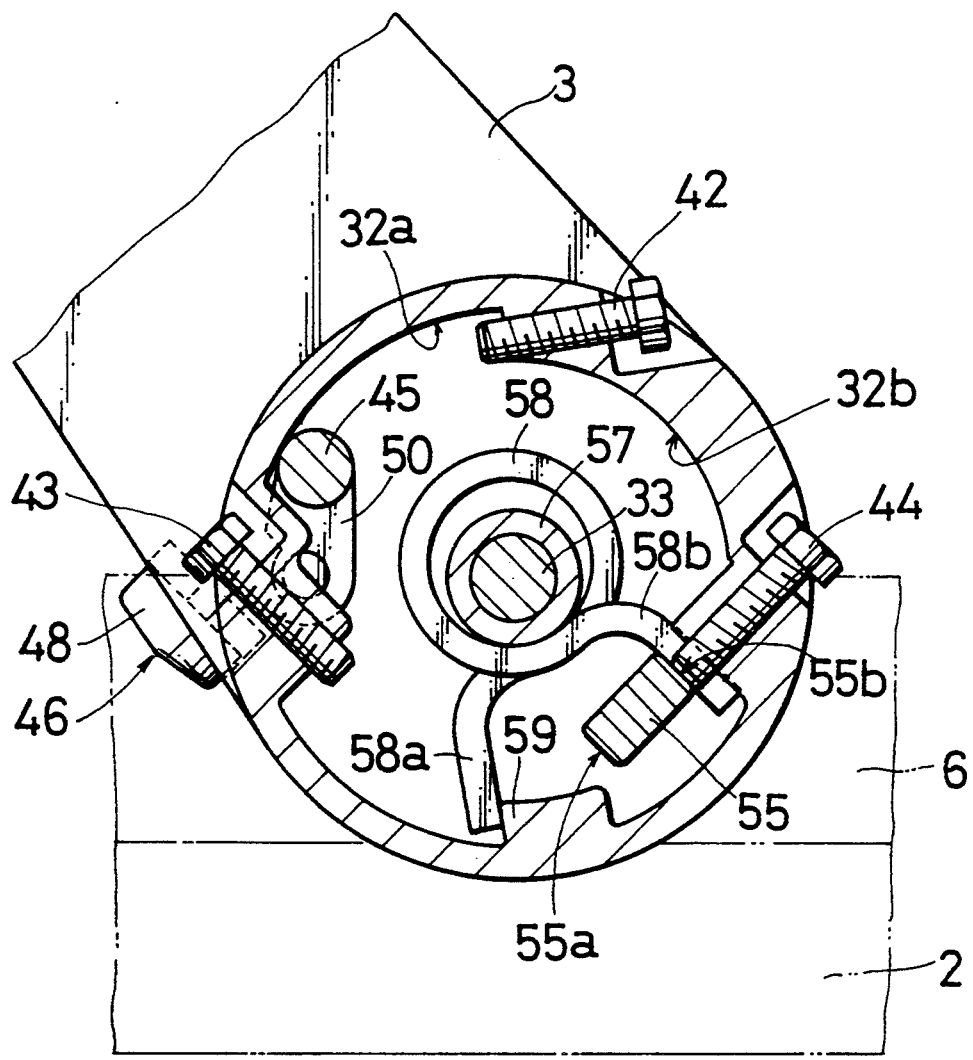
FIG. 10 is a view similar to FIG. 7 but showing the support member pivoted in the leftward direction.

As the support member 3 is pivoted laterally rightwardly from the state shown in FIG. 7 or the rotational portion 35 is rotated in the direction A, the distance between the end portions 58a and 58b of the torsion coil spring 58 increases as shown in FIG. 9. Therefore, the biasing force of the torsion coil spring 58 to return the miter saw unit 4 to the neutral position increases as the pivoted angle increases, so that the operation for laterally pivoting the support member 3 as well as the operation for returning the support member 3 to the vertical position can be easily and smoothly performed.

On the other hand, when the support member 3 is laterally leftwardly pivoted from the state shown in FIG. 7, or the rotational portion 35 is rotated in the direction B, the movement of the miter saw unit 4 can be smoothly performed with the aid of the biasing force of the torsion coil spring 58 in the same direction until the miter saw unit 4 reaches the neutral position. As the support member 3 is further pivoted, the distance between the end portions 58a and 58b increases with the end portion 58a in the clockwise direction engaged by the engaging protrusion and with the other end portion 58b in the counterclockwise direction engaged by the corresponding lateral surface 55b of the stopper member 55. Thus, the biasing force of the torsion spring 58 to return the miter saw unit 4 to the neutral position increases as the inclination angle increases, so that the operation can be easily and smoothly performed as with the case of the rotation in the direction A.

Returning to FIG. 1, a slide bar 60 which supports the miter saw unit 4 is mounted on the upper portion of the support member 3. The slide bar 60 is horizontally slidably movable relative to the upper portion of the support member 3 in the forward and rearward directions. As shown in FIG. 6, a slide bar support cylinder 61 is integrally formed with the upper portion of the support member 3. A cylindrical bearing 62 is fixedly fitted within the support cylinder 61 and receives the slide bar 60 therewithin. The cylindrical bearing 62 is constructed as an angular ball spline and includes a plurality of bearing balls 63 which are partly received within a pair of longitudinal recesses 64 formed on the outer surface of the slide bar 60 and diametrically opposed to each other and which are also partly received within a pair of corresponding recesses (not shown) formed on the inner surface of the cylindrical bearing 62. A bolt 66 is screwed into the upper part of the cylindrical bearing 62 and extends upwardly through a cover 72, so that the bolt 66 is operable to fix the position of the slide bar 60.

As shown in FIGS. 1 and 2, a cap 67 is mounted on the rear end of the slide bar 60. A bracket 71 is fixedly mounted on the forward end of the slide bar 60. The bracket 71 includes a forked hinge portion 70 which vertically pivotally supports a base portion 68 of the miter saw unit 4 through a support pin 69 (see FIG. 1). The cover 72 serves to cover the upper portion of the support member 3 together with the cylindrical bearing 62. Portions of the slide bar 60 exposed to the outside between the cap 67 and the rear end of the cover 72 and between the forward end of the cover 72 and the bracket 71 are covered by bellows 73 and 74, respectively. The bellows 74 is further covered by an auxiliary cover 74a.

A compression spring 75 is interposed between the base portion 68 of the miter saw unit 4 and the bracket 71 at a position adjacent the support pin 69 or the fulcrum point of the miter saw unit 4, so that the compression spring 75 normally urges the miter saw unit 4 upwardly. The base portion 68 and the bracket 71 include spring supports 76 and 77 so as to receive the corresponding ends of the compression spring 75, respectively. A bolt 78 is screwed into the spring support 76 of the base portion 68 and extends substantially in the same direction as the pivotal direction. A stopper 79 is formed on the spring support 77 of the bracket 71 for abutment of the end portion of the bolt 78 thereon to limit the lower stroke end of the miter saw unit 4. The lower stroke end can be adjusted through rotation of the bolt 78.

Here, the lower stroke end determined by the bolt 78 and the stopper 79 is critical and is adjusted in consideration of the positional relationship between the saw blade C and the plate 7 when the saw blade C is lowered to intrude into the base 2 through the plate 7 for normal vertical cutting operation. However, in this embodiment, a mechanism is provided for adjusting the lower stroke end of the miter saw unit 4 to a different stroke end upwardly of the lower stroke end determined by the bolt 78 and the stopper 79 (hereinafter called "critical lower stroke end") according to cutting operations to be performed.

Figure 11:
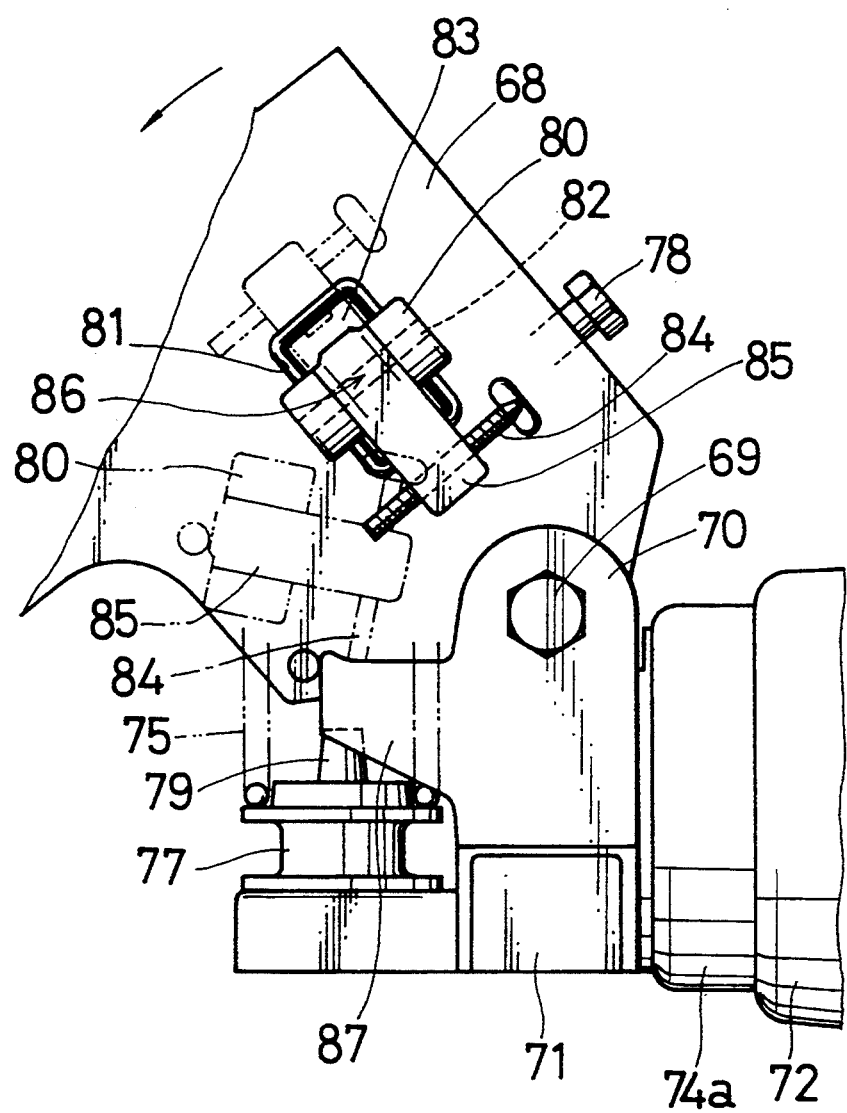
FIG. 11 is an enlarged view of a connecting portion between the support member and the miter saw unit shown in FIG. 1.

As shown in FIG. 11, a rectangular recess 81 is formed on the right side surface of the base portion 68. A spring plate 83 is disposed within the recess 81 and has a central portion to be resiliently deformed. A pair of protrusions 80 are formed on the base portion 68 at both sides of the recess 81 in the longitudinal direction. A pin 82 is mounted on the protrusions 80 and estends therebetween. An arm 85 has one end pivotally connected to the pin 82 and has the other end into which an adjusting bolt 84 screwed. The one end of the arm 85 connected to the pin 82 includes a pair of flat surfaces 86 (one shown in FIG. 11) disposed on both sides of the arm 85 and extending in parallel with the longitudinal direction of the arm 85. The flat surfaces 86 are opposed to each other in a diametrical direction of the pin 82 for abutment on the central portion of the spring plate 83. Through abutment on the spring plate 83, the position of the arm 85 is selectively kept at a first position and a second position where the adjusting bolt 84 is positioned on the side of the support pin 69 with respect to the pin 82 and is positioned on the side away from the support pin 69, respectively. On the other hand, an engaging projection 87 is integrally formed with the hinge portion 70 of the bracket 71 and is positioned for abutment of the lower end of the adjusting bolt 84 thereon when the arm 85 is at the first position and the miter saw unit 4 is vertically downwardly pivoted.

With this construction, when the arm 85 is at the first position, the lower stroke end of the miter saw unit 4 can be determined upwardly of the critical lower stroke end, and such stroke end can be adjusted through the adjusting bolt 84. On the other hand, when the arm 85 is pivoted from the first position to the second position, the adjusting bolt 84 may not abut on the engaging projection 87, so that the miter saw unit 4 can reach the critical lower stroke end.

The construction of the miter saw unit 4 is substantially the same as that of the first embodiment. As shown in FIGS. 1 to 3, the miter saw unit 4 includes a blade case 88 which accommodates the saw blade C to cover substantially the upper half thereof. The base portion 68 is integrally formed with the lower portion of the blade case 88. A safety cover 89 is rotatably mounted on the blade case 88 around the rotational axis of the saw blade C to cover the lower half of the saw blade C. The safety cover 89 is interlocked with an operational link 90 pivotally supported by the bracket 71 of the slide bar 60 in such a manner that the safety cover 89 is rotated to uncover the lower half of the saw blade C as the miter saw unit 4 is pivoted downwardly.

As shown in FIG. 3, a gear housing 91 is integrally formed with the blade case 88 on the right side thereof. A spindle 92 on which the saw blade C is mounted is supported within the gear housing 91. A bevel gear 93 as a reduction gear is mounted on the spindle 92. The motor housing 5 is integrally formed with the gear housing 91 and extends oblique upwardly relative to the blade case 88. The motor M disposed within the motor housing 5 has a motor shaft 94 which extends obliquely upwardly relative to the saw blade C at an angle of 45° and includes an end portion having a gear in engagement with the bevel gear 93. As shown in FIG. 2, a handle 96 operable by the operator for pivotal movement of the miter saw unit 4 is integrally formed with the upper portion of the motor housing 5 and extends forwardly of the motor housing 5.

The operation of the first embodiment will now be explained. As the operator pivots the miter saw unit 4 vertically downwardly through the handle 96, the safety cover 89 is rotated to uncover the saw blade C, so that an operation can be performed to cut a work placed on the base 2. Such a cutting operation may include a normal vertical cutting operation with the saw blade C maintained to be vertical relative to the base 2, and may include an oblique cutting operation with the saw blade C inclined leftwardly or rightwardly relative to the vertical position.

For the normal vertical cutting operation, the rotational portion 35 of the support member 3 is kept at the vertical position shown in FIG. 7 relative to the support portion 32 of the bracket 31 which is integral with the turntable 6. The vertical position is determined through abutment of the stopper pin 45 of the lever 50 of the stopper mechanism 46 on the end portion of the first stopper bolt 42 and is fixed through tightening of the nut 37 by the handle 41. Through adjustment of the driving amount of the first stopper bolt 42, the vertical position can be properly determined.

At this stage, the work (assuming as an elongated one) is placed on the base 2 to extend over both the work support tables 12 and 13, and the lateral position of the work is determined through abutment on the fence 14. On the other hand, the vertical vice device 16 is mounted on the fence 14 by utilizing appropriate one of the inserting holes 30, and the tightening screw 27 is tightened to fix the work in position.

Subsequently, the operator presses the miter saw unit 4 downwardly through the handle 96 against the biasing force of the compression spring 75 so as to pivot the miter saw unit 4 downwardly around the support pin 69. As the miter saw unit 4 is thus pivoted, the safety cover 89 is rotated to uncover the saw blade C. When the saw blade C reaches the work, the lower half of the saw blade C is completely uncovered to cut the work. The miter saw unit 4 is further pivoted downwardly to reach the critical lower stroke end which is determined through abutment of the end portion of the bolt 78 of the base portion 68 on the stopper portion 79 of the bracket 71. (The arm 85 of the adjusting mechanism disposed on the right side of the base portion 68 is normally kept at the second position shown in the dotted line in FIG. 11.) At this stage, the lower part of the saw blade C intrudes into the base 2 through the plate 7 as shown in FIG. 3.

If it is desired to change the lower stroke end of the miter saw unit 4 to a position upwardly of the critical stroke end according to change of kind of cutting operation, or if it is desired to change the most lowered position of the saw blade C to a position upwardly of the plate 7, the operator pivots the arm 85 from the second position to the first position shown by the solid line in FIG. 11 against the resilient force of the spring plate 83, so that the adjusting bolt 84 may abut on the engaging projection 87 to prevent further downward movement of the miter saw unit 4 before the miter saw unit 4 reaches the critical lower stroke end. Further, the lower stroke end determined by the adjusting bolt 84 can be changed by adjusting the screwing position relative to the arm 85. If it is desired to lower the miter saw unit 4 to again reach the critical lower stroke end, the operator pivots the arm 85 from the first position to the second position against the resilient force of the spring plate 83. When the arm 85 reaches the second position, the arm 85 is kept at this position by the resilient force of the spring plate 83, so that the adjusting bolt 84 may not abut on the engaging projection 87.

The miter saw unit 4 is mounted on the slide bar 60 supported by the upper portion of the support member 3, and the slide bar 60 is slidable in the forward and rearward directions relative to the support cylinder 61 of the upper portion of the support member 3. Therefore, when the operator loosens the fixing bolt 66 to permit movement of the slide bar 60 relative to the support member 3, and pulls the miter saw unit 4 forwardly with the handle 96 grasped by his hand, the miter saw unit 4 is moved forwardly through sliding movement of slide bar 60 along the support cylinder 61. Therefore, it becomes possible to cut a work throughout its width by the forward movement of the saw blade C even if the work has a wide width.

The oblique cutting operation with the saw blade C pivoted laterally relative to the vertical position will now be explained. To change the miter saw unit 4 from the vertical position to the laterally pivoted position or laterally inclined position, the operator turns the handle 41 to loosen the nut 37 so as to permit rotation of the rotational portion 35 relative to the support portion 32. Then, the operator pushes the operational knob 48 of the stopper mechanism 46 into the recess 47, resulting in that the stopper pin 45 is moved radially inwardly of the support portion 32 not to abut on the end portion of the first stopper bolt 42. As described above, at the state of FIG. 7 which corresponds to the vertical position of the miter saw unit 4, the moment in the clockwise direction (direction A) is applied to the support member 3 because of positioning of the motor housing 5 on the right side of the miter saw unit 4. Since such moment is greater than the moment applied by the biasing force of the torsion coil spring 58 in the reverse direction (direction B), the support member 3 is automatically laterally pivoted in the direction A when the stopper pin 45 is released. If such lateral pivotal movement has been once started, the operator may release the pushing force applied to the stopper pin 45 through the operational knob 48. Thus, when the pushing force has been released, the stopper pin 45 tends to return to its original position by the biasing force of the torsion coil spring 52. However, at this stage, the stopper pin 45 has been rotated to some extent together with the rotational portion 35 in the clockwise direction and has been moved to reach the guide surface 32b of the support portion 32 over the stepped portion formed on the mounting portion of the first stopper bolt 42. Therefore, the support member 3 can be further pivoted laterally without being prevented by the stopper pin 45.

The above pivotal movement is performed with the handle 96 of the miter saw unit 4 being held by the operator, and a smaller force is required by the operator to hold the miter saw unit 4 since the biasing force of the torsion coil spring 58 is applied in the direction opposite to the pivotal movement and increases as the pivoted angle increases.

The pivotal movement of the support member 3 is stopped through abutment of the stopper member 55 of the rotational portion 35 on the second stopper bolt 43 when the pivoted angle reaches an angle of 45°. Then, the operator turns the handle 41 to tighten the nut 37, so that the rotational portion 35 is fixed in position relative to the support portion 32. Thus, the support member 3 is kept at the pivoted position. The pivoted angle can be appropriately adjusted as desired through adjustment of the screwing position of the second stopper bolt 43.

With the support member 3 thus maintained at the laterally pivoted position, the operator can perform the oblique cutting operation of the work by pressing the miter saw unit 4 downwardly against the biasing force of the compression spring 75 through the handle 96. The lower part of the saw blade C extends downwardly from the plate 7 by substantially the same distance as the vertical cutting operation as shown in FIG. 3 when the miter saw unit 4 reaches the critical lower stroke end determined by abutment of the bolt 78 of the base portion 68 on the stopper portion 79 of the bracket 71.

Since the motor housing 5 extends rightwardly of the miter saw unit 4 and since the fence 14 having the insertion holes 30 for mounting the vice device 16 thereon is disposed on the same side as the direction of extension of the motor housing 5, there will be some possibility that the vice device 16 cannot be used for fixing the work because of the presence of the motor housing 5 when the support member 4 is at the rightwardly pivoted position. However, with this embodiment, the holder 15 is mounted on the end portion of the work support table 12 disposed on the right side, and the position of the holder 15 is adjustable along the guide member 17. The vice device 16 can be mounted on the holder 15 to fixedly press a work W against the holder 15 by tightening the tightening screw 27 as shown in FIGS. 3 and 5. The position of the holder 15 is adjustable relative to the guide member 17 according to the length of the work W. Further, since the guide member 17 is detachably mounted on the work support table 12, the guide member 17 can be removed from the work support table 12 if it is not required, so that an improved operability is obtained.

Figure 16:
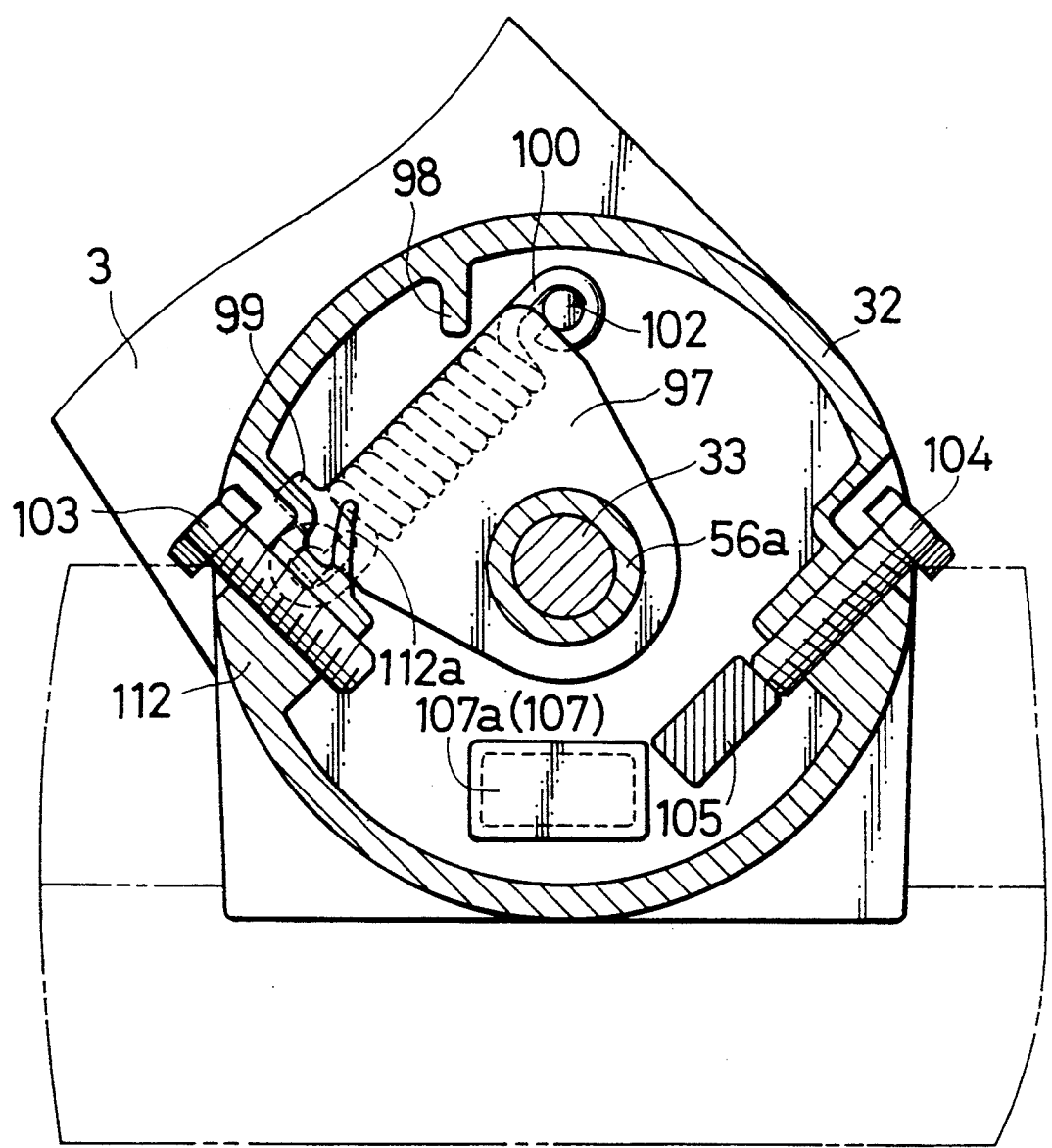
FIG. 16 is a sectional view similar to FIG. 13 but showing the support member pivoted in the leftward direction.

Another oblique cutting operation performed by pivoting the support member 3 from the vertical position in the leftward direction or the opposite direction of the above oblique cutting operation will now be explained. Firstly, the operator turns the handle 41 so as to release the rotational portion 35 from the support portion 32 in the same manner as the above cutting operation. Then, the operator pushes the miter saw unit 4 leftwardly or pivots the support member 3 in the counterclockwise direction (direction B) in FIG. 16 through the handle 96 while the stopper mechanism 46 is kept in position. Although, as described above, the moment of the miter saw unit 4 in the clockwise direction (direction A) is applied to the support member 3 at the vertical position shown in FIG. 7, substantial part of such moment is counterbalanced by the biasing force of the torsion coil spring 58 in the opposite direction. Therefore, a smaller force is required for the operator to pivot the support member 3. Further, after starting the pivotally movement, the gravity center of the miter saw unit 4 including the support member 3 as well as the motor housing 5 soon reaches the position directly above the support shaft 33 of the support portion 32, or the miter saw unit 4 soon reaches the neutral position. When the miter saw unit 4 further pivots from the neutral position, the moment of the miter saw unit 4 including the support member 3 is converted to be applied in the counterclockwise direction (direction B) or the pivoting direction. At the same time therewith, the torsion coil spring 58 applies the force in the opposite direction of the pivoting direction and the force of the torsion coil spring 58 increases as the pivoted angle increases. Therefore, because of the such biasing force of the torsion coil spring 58, during the pivotal operation, a smaller force is required for the operator to support the miter saw unit 4 through the handle 96 as is the case of the rightward pivotal operation. On the other hand, during the pivotal movement of the support member 3, the stopper pin 45 of the stopper mechanism 46 slidably moves along the abutting surface 32a of the support portion 32.

The pivotal movement of the support member 3 is stopped through abutment of the stopper member 55 of the rotational portion 35 on the third stopper bolt 44 when the support member 3 has been pivoted by an angle of 45°. Then, the operator turns the handle 41 to tighten the nut 37, so that the rotational portion 35 is fixed in position relative to the support portion 32. Thus, the support member 4 is maintained at the leftwardly pivoted position, and the oblique cutting operation can be performed by pressing the handle 96 of the miter saw unit 4 downwardly against the biasing force of the compression spring 75. The pivoted angle can be appropriately determined by adjusting the screwing position of the third stopper bolt 44 as is the case of the rightward pivoting operation, and the lower part of the saw blade C extends into the base 2 from the plate 7 by substantially the same distance as that of the vertical cutting operation when the miter saw unit 4 reaches the critical lower stroke end.

With the miter saw 1 of this embodiment, as described in connection with FIG. 4, a plurality of parallel lines 9 are drawn on the plate 7 in the longitudinal direction thereof. As for the miter saw 1 of the type as described above, the cut-out recess 7a is not formed on the plate 7 at the first time but is formed at the working place by cutting the plate 7 by the saw blade C through vertical cutting operation with the support member 3 positioned vertically relative to the base 2. For the cutting operation of the work, the positioning of the work relative to the base 2 is then performed with reference to the cut-out recess 7a thus formed in such a manner that the inked line drawn which may be drawn on the work is positioned to correspond to the position of the saw blade C. However, the cut-out recess 7a has a broader width by the oblique cutting operation with the support member 3 laterally pivoted relative to the vertical position. Therefore, it becomes difficult to position the work in such a manner that the inked line correctly corresponds to the cutting position by the saw blade C with reference to such broadened cut-out recess 7a. In this embodiment, the lines 9 are previously drawn on the plate 7, and therefore, the work can be positioned in such a manner that the inked line exactly corresponds to the cutting position by the saw blade C with reference to either of the lines 9 if the operator calculates the distance between the lines 9 and the cutting position by the saw blade C when the cut-out recess 7a is formed at the first time.

(Second Embodiment)

A second embodiment of the present invention will now be explained with reference to FIGS. 12 to 16. The construction of the second embodiment is the same as the first embodiment excepting the mechanism for determining the pivotal position of the rotational portion 35 of the support member 3 relative to the support portion 32 of the bracket 31 of the turntable 6. Therefore, drawings or an explanation for the construction other than that concerned with the mechanism for determining the pivotal position are omitted. Further, in FIGS. 12 to 16, the same parts as the first embodiment are labeled by the same numeral as the first embodiment and an explanation of the same parts are omitted.

Figure 12:
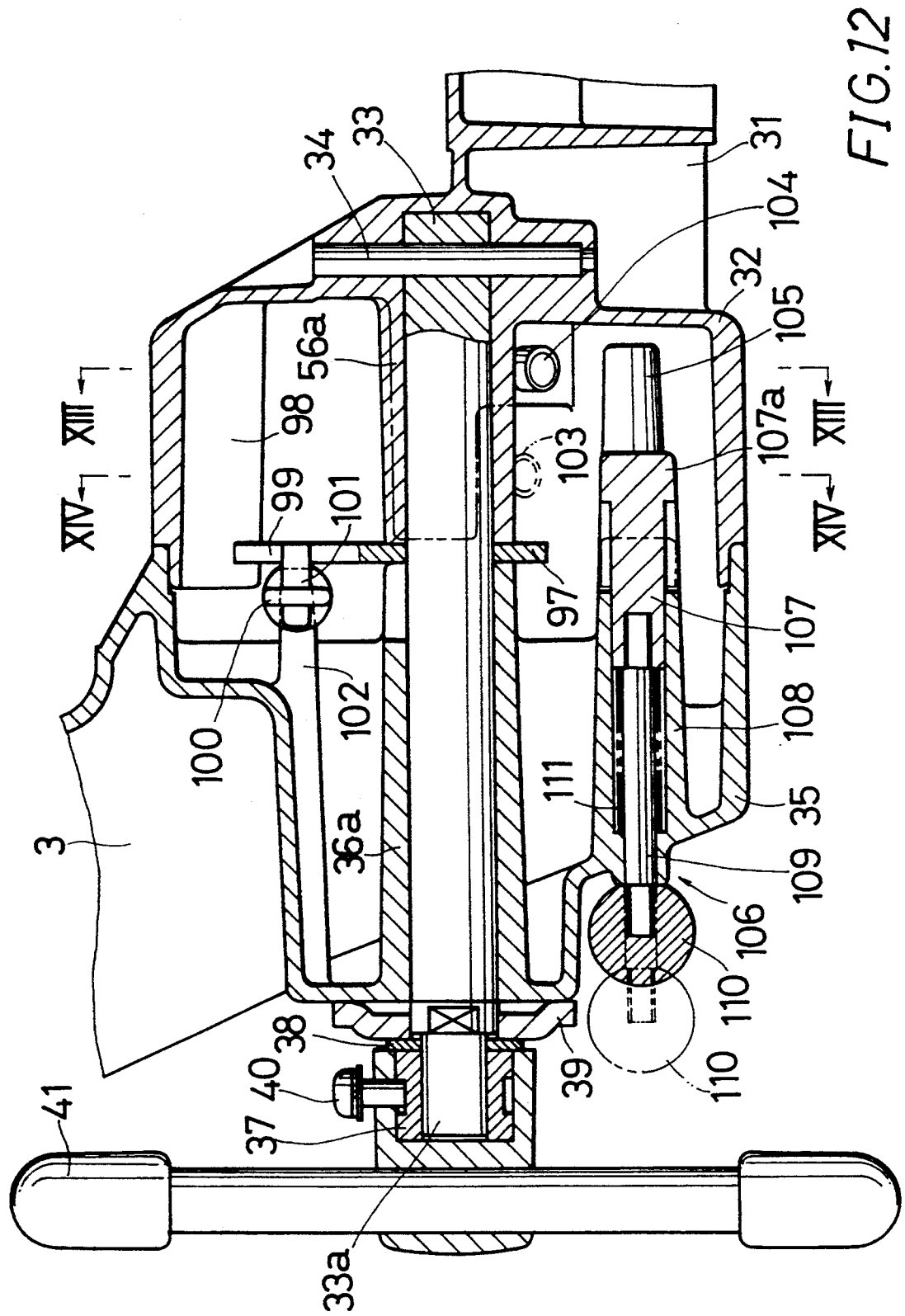
FIG. 12 is sectional view of a connecting portion of a support member and a base of a miter saw according to a second embodiment of the present invention.
Figure 13:
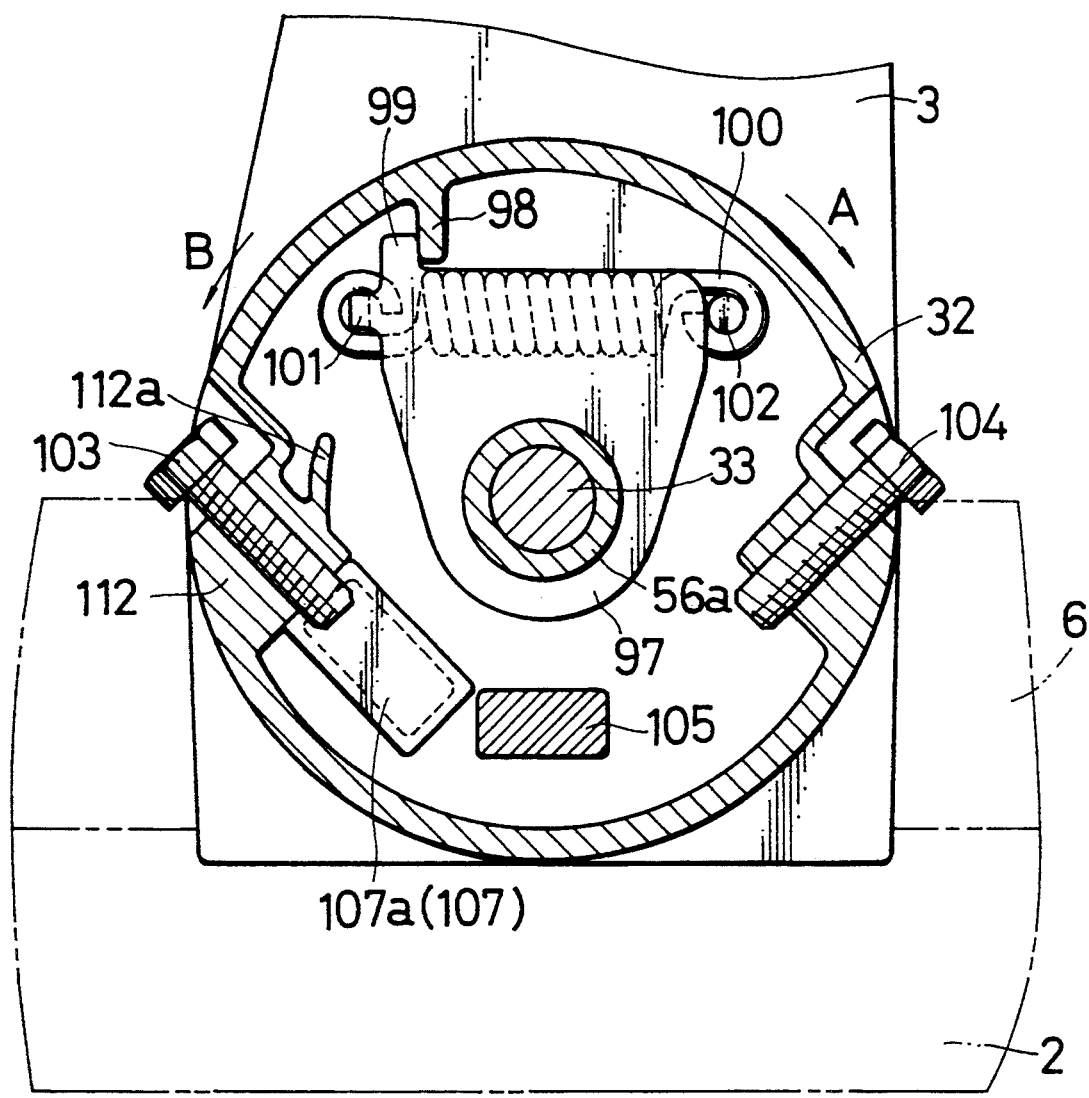
FIG. 13 is a sectional view taken along line XIII—XIII in FIG. 12.

Referring to FIG. 12, a substantially fan-shaped lever is pivotally supported by the support shaft 33 at a position between the sleeve 36a of the rotational portion 35 and the sleeve 56a of the support portion 32. As shown in FIG. 13, an engaging portion 99 is integrally formed with the outer end of the lever 97 in the counterclockwise direction (direction B) and extends substantially radially therefrom. An engaging projection 98 is integrally formed with the inner wall of the support portion 32 and protrudes substantially vertically downwardly therefrom for engagement with the engaging portion 99. A hook portion 101 is integrally formed with the lateral side of the lever 97 in the circumferential direction and is disposed adjacent the engaging portion 99. The hook portion 101 is bent in the axial direction of the support portion 32 for engaging one end of a tension coil spring 100. A hook shaft 102 is integrally formed with the rotational portion 35 for engaging the other end of the tension coil spring 100 and extends in the axial direction toward the support portion 32. As shown in FIG. 12, the hook shaft 102 is positioned on the same level as the hook portion 101 of the lever 97 when the support member 3 is at the vertical position. Further, at the vertical position, the tension coil spring 100 biases the support portion 32 in the counterclockwise direction (direction B) in FIGS. 13 and 14 or the direction opposite to the moment in the clockwise direction (direction A) applied by the miter saw unit 4. When the support member 3 further pivoted by a small angle in the counterclockwise direction (direction B) to reach the neutral position where the gravity center of the miter saw unit 4 including the support member 3 is positioned directly above the support shaft 33, the biasing force of the tension coil spring 100 is no more applied to the support portion 32 as the case of the first embodiment.

A left stopper bolt 103 and a right stopper bolt 104 corresponding to the second stopper bolt 43 and the third stopper bolt 44 of the first embodiment, respectively, are screwed into the support portion 32. As shown in FIG. 12, the left stopper bolt 103 is displaced in the axial direction toward the rotational portion 35 relative to the right stopper bolt 104. A stopper member 105 corresponding to the stopper member 55 of the first embodiment is integrally formed within the lower part of the rotational portion 35 and extends into the support portion 32. The stopper member 105 performs the same function as the stopper member 55 to determine the laterally pivoted position through abutment on either of the end portions of the left stopper bolt 103 and the right stopper bolt 104.

In this second embodiment, a stopper mechanism 106 utilizing the left stopper bolt 103 is provided for determining the vertical position of the support member 3. The stopper mechanism 106 will now be described.

Figure 14:
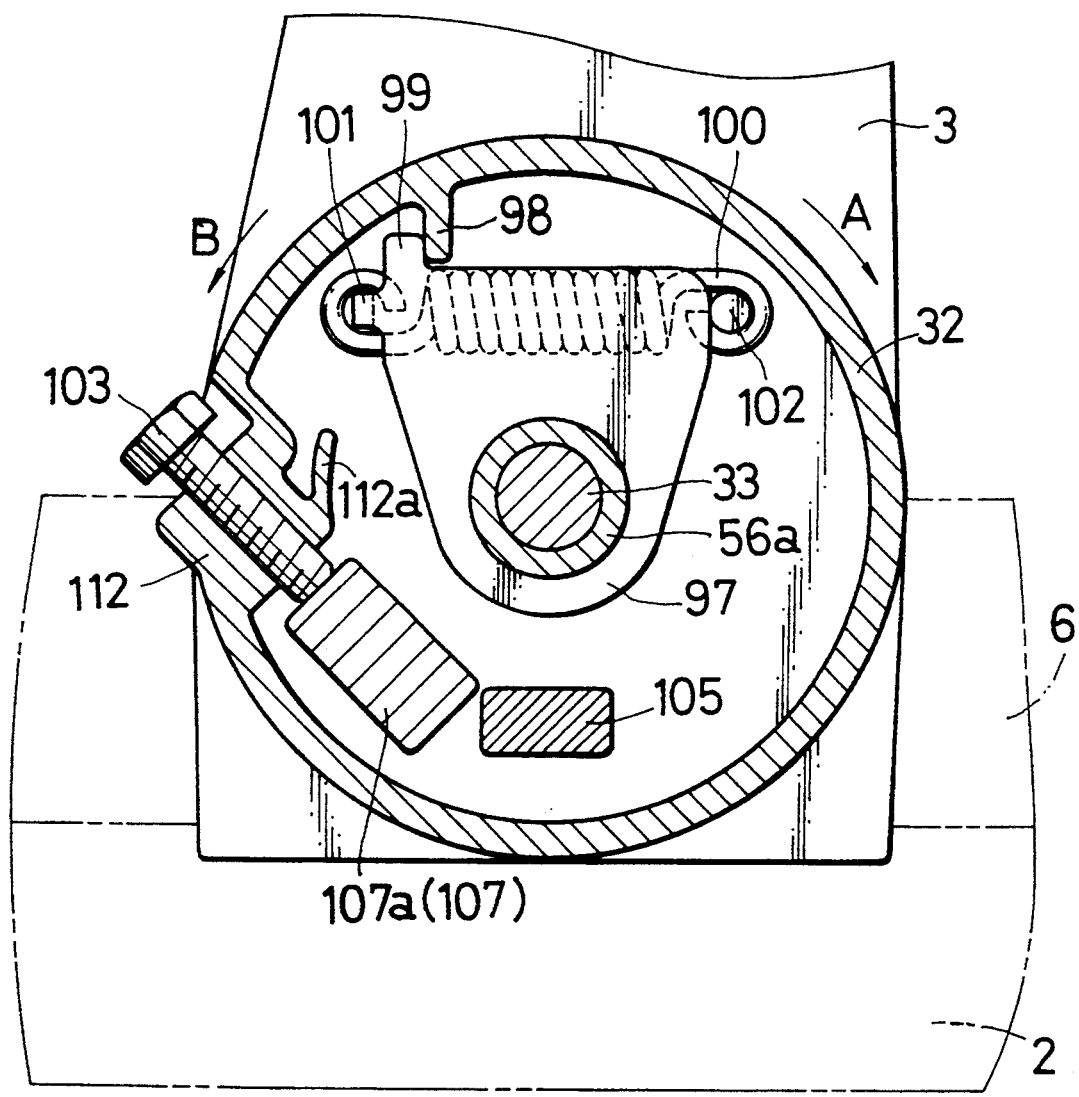
FIG. 14 is a sectional view taken along line XIV—XIV in FIG. 12.

As shown in FIG. 12, a guide sleeve 108 is integrally formed with the lower part of the rotational portion 35 and is disposed therewithin. The guide sleeve 108 extends in the axial direction and is positioned adjacent the stopper member 105 in the clockwise direction. A stopper shaft 107 having a rectangular configuration in section is slidably received within the guide sleeve 108. An operational rod 109 is threadably engaged with the forward portion of the stopper shaft 107. The rear end of the operational rod 109 extends outwardly from the rotational portion 35 and includes a spherical operational knob 110 fixed thereto. A compression coil spring 111 is disposed within the guide sleeve 108 and is fitted around the operational rod 109. The compression spring 111 serves to normally bias the stopper shaft 107 together with the operational rod 109 in the forward direction. Thus, the stopper shaft 107 is normally kept by the biasing force of the compression spring 111 at an extended position where the operational knob 110 abuts on the outer surface of the rotational portion 35. At the extended position, a forward portion 107a of the stopper shaft 107 serves to abut on the end portion of the left stopper bolt 103 as shown in FIG. 14. The forward portion 107a is enlarged relative to the other portion of the stopper shaft 107, so that the forward portion 107a abuts on the forward end of the guide sleeve 108 when the operator pulls the operational knob 110 rearwardly against the biasing force of the compression spring 111 as shown by a dotted line in FIG. 12. The stopper shaft 107 thus retracted may not be interfered with the left stopper bolt 103 as well as a mounting portion 112 of the left side stopper bolt 103 when the support member 3 is pivoted. Further, the mounting portion 112a includes a protrusion 112a formed on the side of the clockwise direction thereof and extends in the circumferential direction. The function of the protrusion 112a will be explained later.

The operation of the second embodiment will now be explained. When the support member 3 is at the vertical position, the engaging portion 99 is in engagement with the engaging projection 98 of the support portion 32. On the other hand, as described above, the tension coil spring 100 biases the rotational portion 35 in the counterclockwise direction (direction B) against the moment of the miter saw unit 4 in the clockwise direction (direction A). At this stage, by the moment of the miter saw unit 4 in the direction A which surmounts the biasing force of the tension coil spring 100, the forward portion 107a of the stopper shaft 107 abuts on the end portion of the left stopper bolt 103 as shown in FIG. 14, so that the vertical position of the support member 3 is determined. The rotational portion 35 is fixed in position relative to the support portion 32 through turning operation of the handle 41 as is the case of the first embodiment, and the vertical cutting operation can be performed in the same manner as the first embodiment.

In order to perform the oblique cutting operation with the support member 3 pivoted in the rightward direction (direction A), the operator operates the handle 41 to release the rotational portion 35 from the support portion 32. The operator subsequently pulls the operational knob 110 of the stopper shaft 107 of the stopper mechanism 106 rearwardly, so that the forward portion 107a of the stopper shaft 107 is moved away from the position for abutment on the left stopper bolt 103. Then, the support member 3 automatically pivots rightwardly by the moment of the miter saw unit 4 in the direction A. As the support member 3 is thus pivoted, the distance between the hook portion 101 of the lever 97 and the hook shaft 102 of the rotational portion 35 becomes larger, so that the biasing force of the tension coil spring 100 in the opposite direction of the pivotal movement increases as the pivoted angle increases. Therefore, a smaller force is required for the operator to support the miter saw unit 4 through the handle 96. Further, when the support member 3 is thus pivoted, the stopper shaft 107 of the stopper mechanism 106 is moved to a position on the rear side of the mounting portion 112 in the axial direction. Therefore, when the operator releases the operational knob 110, the forward portion 107a of the stopper shaft 107 abuts on the rear surface of the mounting portion 112 and the forward portion 107a slidably moves along the rear surface with the pivotal movement. Thus, the pivotal movement of the support member 3 can be smoothly performed without being prevented by the stopper shaft 107.

The pivotal movement of the support member 3 is stopped when the lateral surface of the stopper member 105 abuts on the end portion of the left stopper bolt 103. Then, the operator turns the handle 41 to fix the rotational portion 35 in position relative to the support portion 32, so that the oblique cutting operation can be performed with the support member 3 pivoted in the rightward direction. As the pivotal movement occurs, the stopper shaft 107 of the stopper mechanism 106 moves beyond the mounting portion 112 of the left stopper bolt 103 in the clockwise direction to some extent. However, the projection 112a is formed with the mounting portion 112, and therefore, the forward portion 107a of the stopper shaft 107 is kept in abutment on the projection 112a and may not be returned to the extended portion.

For the oblique cutting operation with the support member 3 pivoted in the leftward direction (direction B), the operator operates the handle 41 to release the rotational portion 35 from the support portion 32. The operator then pivots the miter saw unit 4, which is in the vertical position, leftwardly against the moment of the miter saw unit 4 with the aid of the biasing force of the tension coil spring 100. The biasing force of the tension coil spring 100 is no more applied when the support member 3 is pivoted beyond the neutral position, and thereafter pivotal operation is performed with the operator supporting the miter saw unit 4 through the handle 96 without the aid of the biasing force. During the pivotal movement, the stopper shaft 107 of the stopper mechanism 106 passes through the lower space within the support portion 32 formed between the left stopper bolt 103 and the right stopper bolt 104. Since there exists no parts in the lower space which may prevent movement of the stopper shaft 107, it is not required to pull the operational knob 110 of the stopper mechanism 110 for this pivotal operation.

Figure 15:
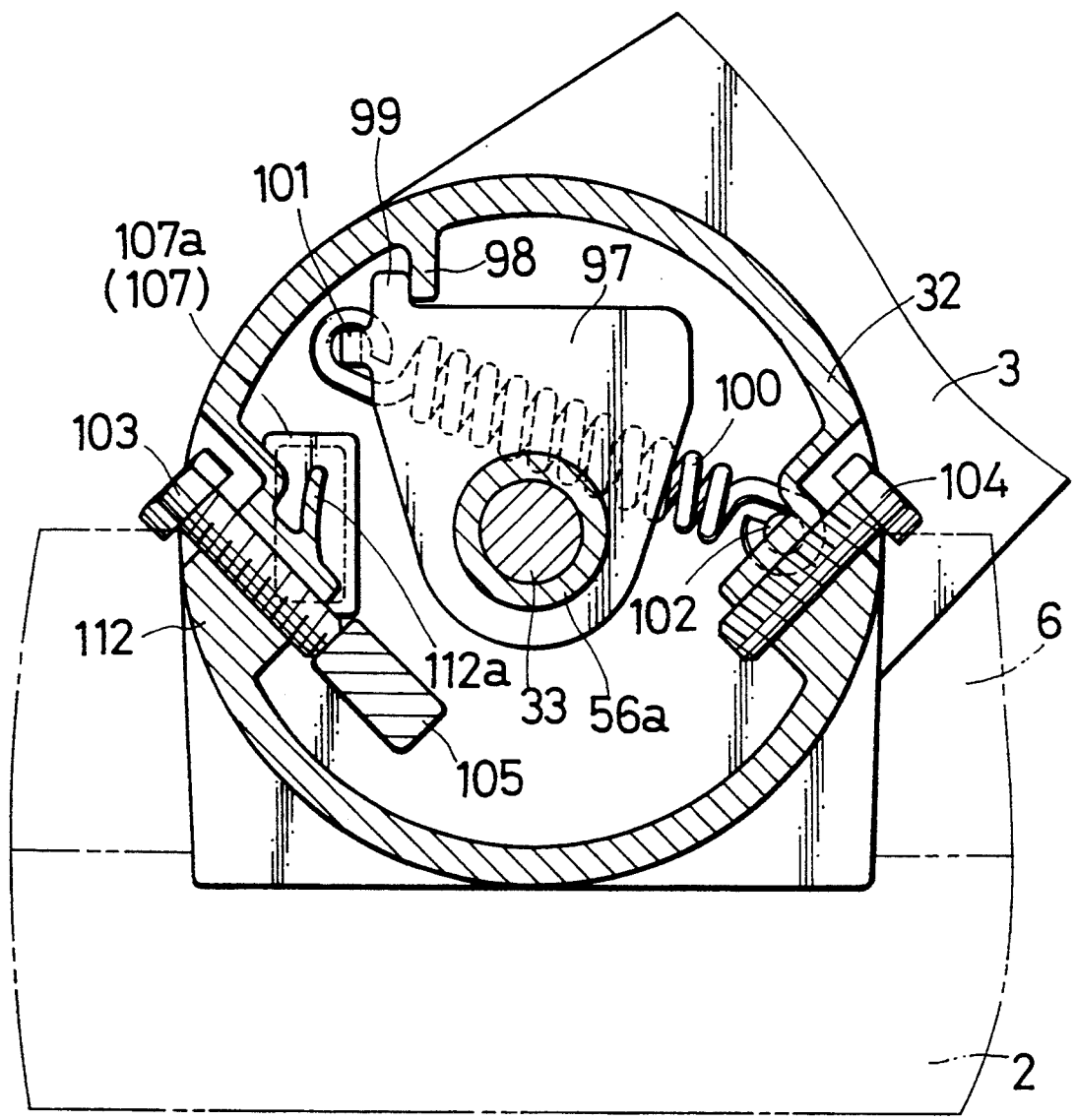
FIG. 15 is a sectional view similar to FIG. 13 but showing the support member pivoted in the rightward direction.

The pivotal movement of the support member 3 is stopped when the lateral surface of the stopper member 105 abuts on the end portion of the right stopper bolt 104 as shown in FIG. 15. Then, the operator turns the handle 41 to fix the rotational portion 35 in position relative to the support portion 32, so that the oblique cutting operation can be performed with the support member 3 pivoted in the leftward direction.

While the invention has been described with reference to preferred embodiments, it is to be understood that modifications or variation may be easily made without departing from the spirit of this invention which is defined by the appended claims.

What is claimed is:

1. A miter saw comprising:
    a base on which a work is placed;
    a miter saw unit supporting a saw blade and having a motor for rotatably driving said saw blade;
    a support mechanism supporting said miter saw unit relative to said base in such a manner that said miter saw unit is laterally leftwardly and rightwardly pivotable in opposed directions from a vertical position and respectively toward left and right predetermined positions; and
    biasing means interposed between said miter saw unit and said base and defining a biasing force for biasing said miter saw unit in a direction opposite to at least one of said opposed directions of the lateral pivotal movement of said miter saw unit when said miter saw unit is laterally pivoted in said at least one of said opposed directions;
    said biasing force of said biasing means being weaker than the gravitational force acting on the miter saw unit permitting a lateral pivotal movement of said miter saw unit, including said motor, toward a corresponding one of said left and right predetermined positions against said biasing force upon pivotal movement of said miter saw unit in said at least one of said opposed directions from said vertical position.

2. The miter saw as defined in claim 1 wherein said support mechanism includes a movable support member on which said miter saw unit is mounted and a fixed support member mounted on said base; said movable support member is pivotally supported by said fixed support member around a pivotal axis extending in substantially horizontal direction.

3. The miter saw as defined in claim 2 wherein said biasing means applies no biasing force to said miter saw unit when said miter saw unit is positioned at a neutral position where the center of gravity of said miter saw unit and said movable support member is positioned substantially on said pivotal axis.

4. The miter saw as defined in claim 3 wherein said biasing means provides a greater biasing force as said miter saw unit is pivoted from said neutral position.

5. The miter saw as defined in claim 3 wherein said neutral position is displaced from said vertical position; said biasing means applies the biasing force against the moment produced by the gravitational force acting on said miter saw unit and said movable support member when said miter saw unit is positioned at said vertical position.

6. The miter saw as defined in claim 5 wherein said motor is disposed on one lateral side of said miter saw unit, so that said neutral position is displaced from said vertical position toward a direction opposite to said one lateral side.

7. The miter saw as defined in claim 5 and further including stopper means operable to determine the position of pivotal movement of said miter saw unit at any one of said vertical position, said left predetermined position and said right predetermined position; said stopper means engages said miter saw unit at both said left predetermined position and said right predetermined position against the moment produced by the gravitational force acting on said miter saw unit and said movable support member; and the biasing force of said biasing means being smaller than the moment force produced by the gravitational force acting on said miter saw unit and said movable support member.

8. The miter saw as defined in claim 2 wherein said biasing means is a torsion coil spring having one end engaged by said movable support member and having the other end engaged by said fixed support member, so that said torsion coil spring applies the biasing force to said miter saw unit when said miter saw unit is laterally pivoted in either of said opposed directions; and said torsion coil spring has an axis which substantially coincides with said pivotal axis.

9. The miter saw as defined in claim 8 wherein said fixed support member includes a cylindrical support portion; said movable support member includes a cylindrical rotational portion; said support portion and said rotational portion have central axes which coincides with said pivotal axis; said rotational portion is rotatably connected to said support portion around said pivotal axis; and said support portion and said rotational portion cooperatively form a space therewithin for accommodating said torsion coil spring.

10. The miter saw as defined in claim 9 wherein said fixed support member further includes a support shaft extending into said space; said support shaft cooperates with said support portion for rotatably supporting said rotational portion; said torsion coil spring is slidably fitted on said support shaft; said one end of said torsion spring is engaged by a first engaging portion disposed on said support portion; said other end is engaged by a second engaging portion disposed on said rotational portion.

11. The miter saw as defined in claim 2 wherein said biasing means is a tension coil spring having one end engaged by said movable support member and having the other end engaged by said fixed support member.

12. The miter saw as defined in claim 11 wherein said fixed support member includes a cylindrical support portion; said movable support member includes a cylindrical rotational portion; said support portion and said rotational portion have central axes which coincides with said pivotal axis; said rotational portion is rotatably connected to said support portion around said pivotal axis; and said support portion and said rotational portion cooperatively form a space therewithin for accommodating said tension coil spring.

13. The miter saw as defined in claim 12 wherein said fixed support member further includes a support shaft extending into said space; said support shaft cooperates with said support portion for rotatably supporting said rotational portion; a lever is pivotally mounted on said support shaft; and said one end of said tension coil spring is engaged by said support portion through said lever; and said other end of said tension spring is connected to a part of said rotational portion.

* * * * *